US012092419B2

(12) United States Patent
Turnblom

(10) Patent No.: US 12,092,419 B2
(45) Date of Patent: Sep. 17, 2024

(54) WIPE-CUTTING TOOL

(71) Applicant: Silencerco, LLC, West Valley City, UT (US)

(72) Inventor: Jacob Scott Turnblom, West Valley City, UT (US)

(73) Assignee: Silencerco, LLC, West Valley City, UT (US)

( * ) Notice: Subject to any disclaimer, the term of this patent is extended or adjusted under 35 U.S.C. 154(b) by 104 days.

(21) Appl. No.: 17/941,650

(22) Filed: Sep. 9, 2022

(65) Prior Publication Data

US 2023/0003480 A1 Jan. 5, 2023

Related U.S. Application Data

(63) Continuation of application No. 16/899,265, filed on Jun. 11, 2020, now Pat. No. 11,473,870.

(51) Int. Cl.

| | |
|---|---|
| ***F41A 35/00*** | (2006.01) |
| ***B26F 1/38*** | (2006.01) |
| ***F41A 21/30*** | (2006.01) |
| ***F41A 21/34*** | (2006.01) |
| ***F41A 21/36*** | (2006.01) |

(52) U.S. Cl.

CPC ............ *F41A 35/00* (2013.01); *B26F 1/3846* (2013.01); *F41A 21/30* (2013.01); *F41A 21/34* (2013.01); *F41A 21/36* (2013.01)

(58) Field of Classification Search

CPC .......... F41A 35/00; F41A 21/30; F41A 21/34; F41A 21/36; B26F 1/3846

USPC ............................................................ 89/14.3

See application file for complete search history.

(56) References Cited

U.S. PATENT DOCUMENTS 2,477,572 A 8/1949 Blasak
2,765,706 A 10/1956 Strohl
3,344,451 A * 10/1967 Finch ........................ B23G 1/22 408/110
3,540,329 A * 11/1970 Gill .......................... B23B 5/162 144/205
4,040,331 A * 8/1977 Litman .................... F42B 12/34 102/515
4,919,035 A * 4/1990 Pinkston ................. B23B 5/168 408/239 R
5,011,498 A 4/1991 Krumeich et al.

(Continued)

OTHER PUBLICATIONS

AR15.com; Wipe material and dimensions; https://www.ar15.com/forums/armory/wipe-material-and-dimensions/20-498109; 19 pages.

*Primary Examiner* — Samir Abdosh
(74) *Attorney, Agent, or Firm* — Holland & Hart LLP

(57) ABSTRACT

A wipe-cutting tool integrated into a firearm or firearm accessory, or component thereof, which can be replaced in the field. The muzzle accessories may include a suppressor, a brake, a compensator or a flash suppressor. The components may include an endcap, the end of an accessory, a muzzle or a baffle. Cutting blades are integrated into the firearm or muzzle accessory and may be integrally formed with the suppressor or compensator tube as well as with a muzzle end cap attached to the tube. When pressed into a substrate of material suitable to form a wipe the cutting blade separates a wipe from the substrate which can be readily inserted into the suppressor or compensator at the muzzle end.

21 Claims, 8 Drawing Sheets

(56) References Cited

U.S. PATENT DOCUMENTS

| | | | | |
|---|---|---|---|---|
| 5,036,747 | A * | 8/1991 | McClain, III | F41A 21/36<br>89/14.3 |
| 7,174,667 | B2 | 2/2007 | Connal | |
| 7,249,551 | B1 | 7/2007 | Ray | |
| 8,091,266 | B2 | 1/2012 | Huang | |
| 8,627,755 | B1 * | 1/2014 | Eckel | F41A 21/36<br>89/14.3 |
| 8,679,399 | B2 * | 3/2014 | Bleicken | B23K 23/00<br>266/49 |
| 10,082,355 | B2 | 9/2018 | Addis | |
| 10,508,885 | B1 * | 12/2019 | Kauffman, Jr. | F41C 27/16 |
| 11,473,870 | B2 * | 10/2022 | Turnblom | F41A 21/36 |
| 11,512,917 | B2 * | 11/2022 | Turnblom | F41A 21/325 |
| 2019/0329439 | A1 | 10/2019 | Bury et al. | |
| 2021/0071978 | A1 | 3/2021 | Washburn, III et al. | |

* cited by examiner

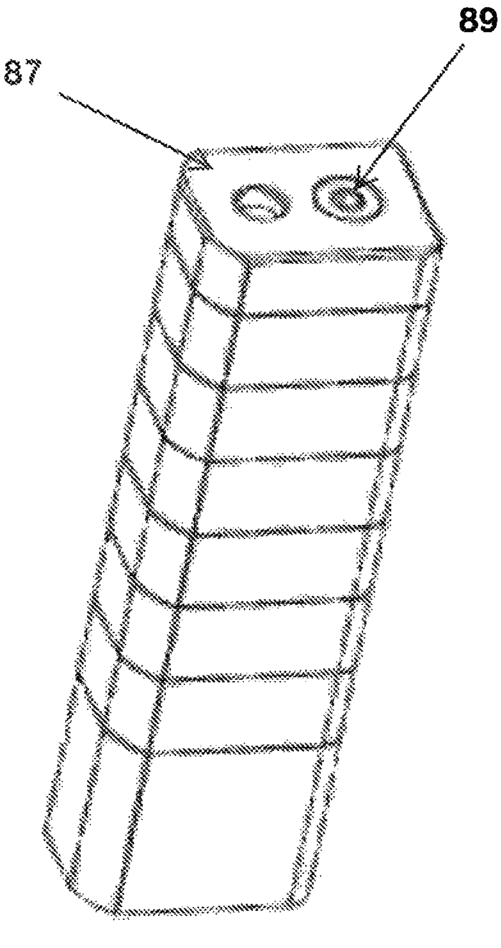
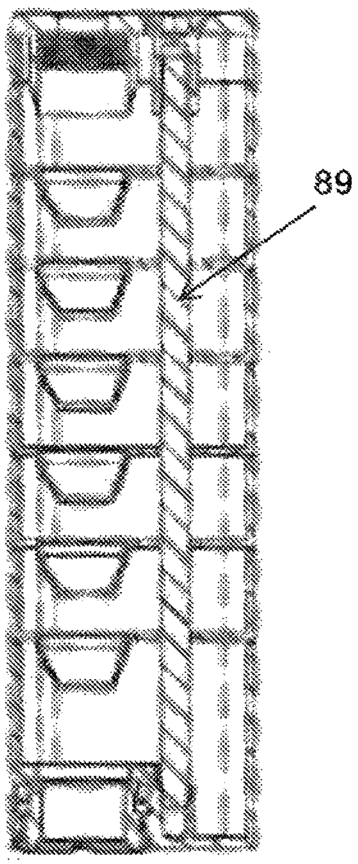
FIG. 9
FIG. 10

WIPE-CUTTING TOOL

CROSS-REFERENCE

The present Application for Patent is a continuation of U.S. patent application Ser. No. 16/899,265 by Turnblom, entitled "WIPE-CUTTING TOOL" filed Jun. 11, 2020, assigned to the assignee hereof, and is expressly incorporated by reference in its entirety herein.

TECHNICAL FIELD

The present disclosure relates generally to a cutting tool integrated into a firearm. More particularly, the disclosure relates to a cutting tool configured to cut wipes from a substrate for field-replacement.

BACKGROUND

Wipe elements or "wipes," are replaceable baffles used in sound suppressors. Early wipes were manufactured disks made of a penetrable membranes made of soft material, such as rubber or felt. During their manufacturing a series of disks separated by annular spacers were placed transversely to the shooting axis. The suppressor was mounted on a muzzle and when fired, the projectile passed through the wipes, creating a hole of the same caliber as the projectile. The wipe formed a seal around each projectile as it passed through the wipe so as to inhibit the escape of propellant gases from the suppressor. As a result, the wipe dissipates acoustic energy to reduce the sound level of the report.

Later, as suppressor technology improved to non-replaceable baffles, wipes were placed generally closer to the exit point of the suppressor where gases are at a lower temperature and pressure. However, wipe installment and replacement remained with the factory. Other wipe manufactures encourage a user to replace a wipe on a 1-to-1 basis as a wipe is degraded.

Each wipe has a limited life and must be replaced after it becomes ineffective due to wear, and can last as few as 10-20 rounds, depending on the material used for the wipe as well as the shape and speed of the bullet. As a result, wipes need to be regularly replaced. It would be advantageous to permit a shooter to easily cut wipes of the proper size from a substrate of wipe material.

BRIEF SUMMARY

The general purpose of the systems and methods disclosed herein is to provide an improved wipe-cutting tool. Specifically, the invention describes a wipe-cutting tool integrated into the body, accessory, or accessory components of a firearm that permits the shooter to replace used wipes in the field. The overall apparatus contains a cutting blade configured to cut a wipe from a wipe substrate. This apparatus is designed to work in conjunction with a variety of existing firearms and firearm accessories, but it could also be included in conjunction with a cutting tool that is separate from a firearm.

In one non-limiting embodiment, the apparatus comprises a cutting tool configured to cut a wipe from a substrate. In some embodiments the cutting tool comprises a plate. In some embodiments the cutting tool comprises a skirt extending from the plate. In some embodiments the skirt is welded to the plate, while in some embodiments the skirt is milled. In some embodiments the distal edge of the skirt comprises a cutting blade. In some embodiments the cutting blade is configured to cut a wipe from a substrate. In some embodiments the wipe is cut to a pre-determined size. In some embodiments the wipe can be manually placed in a receiver. In some embodiments the receiver positions the wipe transversely a firing axis of a firearm.

Reference throughout this specification to features, advantages, or similar language does not imply that all of the features and advantages that may be realized with the present disclosure should be or are in any single embodiment of the invention. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment, but may refer to every embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The features and advantages of the present disclosure will become more fully apparent from the following description and appended claims, or may be learned by the practice of the invention as set forth hereinafter.

BRIEF DESCRIPTION OF THE DRAWINGS

In order to describe the manner in which the advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 9 is a perspective view of a muzzle accessory comprising a wiped suppressor or a wiped compensator according to the invention;

FIG. 10 is a longitudinal sectional view of an example embodiment of a wiped suppressor according to the invention.

DETAILED DESCRIPTION OF THE INVENTION

Figure 1:
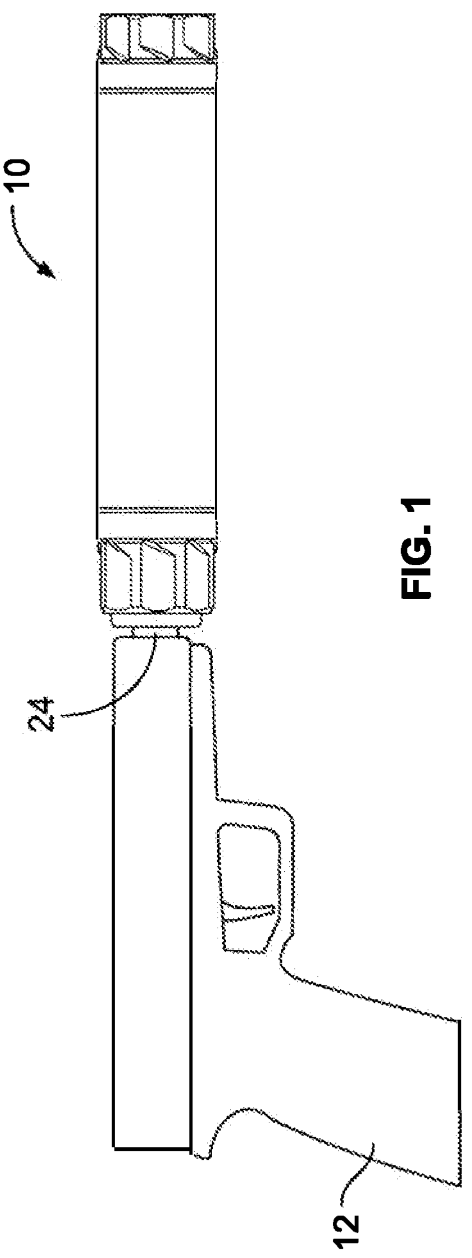
FIG. 1 is a side view of a firearm having an example wiped suppressor according to the invention.

The present embodiments of the present disclosure will be best understood by reference to the drawings, wherein like parts are designated by like numerals throughout. It will be readily understood that the components of the disclosed invention, as generally described and illustrated in the figures herein, could be arranged and designed in a wide variety of different configurations. Thus, the following more detailed descriptions of the embodiments of the apparatus, as represented in FIGS. 1-10 are not intended to limit the scope of the invention, as claimed, but are merely representative of present embodiments of the invention.

In general, the figures disclose an invention that cuts wipes from a substrate in the field to allow the shooter to manually replace an ineffective wipe.

In the following description, numerous references will be made to firearms, and muzzle accessories such as suppressors, compensators, brakes, flash compensators, as well as flash, bullets, projectiles and firearm structures, but these items are not shown in detail in the figures. However, it should be understood that one of ordinary skill in the art and in possession of this disclosure, would readily understand how the present disclosure and existing firearm structures and muzzle accessories can be incorporated.

Detailed references will now be made to the preferred embodiments of the disclosed invention, examples of which are illustrated in FIGS. 1-10 illustrate various views of a cutting tool 100 in accordance with one or more embodiments of the invention.

Some embodiments comprise a cutting tool for cutting a wipe from a substrate. The cutting tool comprises a cutting blade 52. In some embodiments the cutting blade 52 is configured to cut a wipe. In some embodiments the cutting blade 52 cuts the wipe from a substrate. In some embodiments the sheet of wipe material comprises a sheet of the wipe material which may be rolled or stored in other ways. In some embodiments the sheet is laid flat and the cutting tool is positioned against and then pressed through the substrate to cut a piece of the substrate in the shape of the cutting tool. In some embodiments the substrate is polyurethane, rubber, in other embodiments the wipe substrate is a corrugated fiber. In other embodiments the wipe substrate material is a composite of natural fibers and synthetic fibers engineered to allow penetration in the center but slow the degradation of the wipe to allow its use for a longer time. In some embodiments the wipe is a round shape. In some embodiments the wipe is a polygon. In some embodiments the cutting tool is in the shape of the baffles with which the cutting tool is going to cut.

In some embodiments the cutting tool comprises a plate which runs transversely the firing axis. In some embodiments the plate is annular. In some embodiments the plate is a polygon. In some embodiments the plate is milled into the body of a firearm. In some embodiments the plate is a portion of a firearm accessory, such as a magazine. In some embodiments the plate is a muzzle accessory. In some embodiments the plate is a component of a muzzle accessory. In some embodiments a skirt is a component of a muzzle accessory. In some embodiments a baffle is a component of a muzzle accessory. In some embodiments a cover is a component of a muzzle accessory. A cutting blade may be incorporated into a muzzle accessory or a component of a muzzle accessory, or into the barrel, stock, grip or other parts of the firearm.

In some embodiments a skirt extends from the plate. In some embodiments the skirt is orthogonal the plate. In some embodiments the skirt extends from the plate at an angle, widening as it extends from the plate. In some embodiments the skirt narrows as it extends from the plate. In some embodiments the skirt is retractable. In some embodiments the skirt forms the leading edge of the cutting tool. In some embodiments the distal edge of the skirt comprises a cutting blade.

In some embodiments the cutting tool comprises a wipe-receiving member. In some embodiments the wipe-receiving member comprises a shoulder that is proportionally smaller than the wipe-receiving member whereby the wipe may be pressed over the shoulder to settle and be retained in the wipe-receiving member. In some embodiments the wipe-receiving member is angled so as to narrow moving from the distal cutting blade toward the plate. In some embodiments the wipe-receiving member is substantially straight from the distal end of the skirt until the plate.

In some embodiments the cutting blade is configured to be manually pressed against the substrate so as to cut a portion of the substrate into the shape of a wipe. In some embodiments the skirt is shaped in a polygon. In some embodiments the skirt is shaped to cut the wipe in the shape of a suppressor baffle. In some embodiments the skirt is shaped to cut the wipe into the shape of the muzzle accessory. In some embodiments the wipe cut as an annular circular. In some embodiments the wipe is cut in the shape of an oval. In some embodiments the cutting tool is configured to cut the substrate in the field, thus allowing the shooter to replace consumed wipes without removing all muzzle accessories.

In some embodiments the distal edge, or the edge away from the plate, of the skirt comprises a cutting blade configured to cut a wipe from a substrate. In some embodiments the wipe is cut to a pre-determined size, such as the size of a receiving member positioned transversely to the firing axis.

Selection of wipe material is based on tradeoffs—thick wipes may provide improved durability, but reduce accuracy, while other materials interfere less with the bullet, but do not maintain a tight seal with passing bullets. Selecting the optimal wipe material also depends on bullet shapes and speeds. In some embodiments the wipes of differing materials can be selectively exchanged to achieve the desired affects based on the selected material. In some embodiments the wipe can be selectively exchanged based on the ammunition, such as overpressure loads, or bullet characteristics (Lead Round Nose, Wad Cutter, Semi Wad Cutter, Semi-Jacketed, Full Metal Jacket, Semi-Jacketed Hollow Point, Jacketed Hollow Point, Special, as well as others).

The wipe is secured in position in a receiving member formed in a muzzle device or a muzzle accessory. A muzzle accessory may comprise a suppressor, a flash suppressor, a compensator, a muzzle brake, flash hider, wiped suppressor, wiped flash suppressor, wiped compensator, wiped muzzle brake or wiped flash hider. A muzzle accessory component may comprise any member of a muzzle accessory including a baffle, a plate, a skirt a vent or a combination of components making up an accessory. In some embodiments the cutting tool is incorporated into the end of a barrel. In some embodiments, the wipe is used in connection with a flash suppressor by improving the mixture of gasses escaping from the muzzle. In some embodiments the wipe improves the performance of the accessory, such as a compensator. In some embodiments the compensator redirects the burnt powder gasses created upwards when the bullet is fired to counter muzzle rise or muzzle flip. In some embodiments the muzzle accessory comprises a muzzle brake. Muzzle brakes direct the air to slow the burn of powder escaping from the muzzle. A wipe used in conjunction with a brake forces more of the gases through the vents, improving the mixture of the gases. In some embodiments the wipe, used in conjunction with a muzzle device or muzzle accessory improves the disbursement of the muzzle flash, changing the firearm's flash signature and increasing or concealing the shooter's possible position. In some embodiments the wipe in these (non-suppressor) applications restricts the amount of gas pressure able to exit forward (in line with the bore which is essentially wasted flow in terms of activating a braking/compensating effect) thus forcing an increased amount of gas to exit out of the ports in the sides or above instead which create the braking/compensating effect. Therefore increasing the effectiveness of the muzzle accessory, brake or compensator.

In some embodiments the wipe is configured to be manually placed in a receiving member. Wipe replacement is configured to be simple, without requiring additional tools or involve sending the muzzle accessory to the manufacturer or a factory. In some embodiments a single person can replace the wipe. In some embodiments the wipe can be replaced in the field. In some embodiments a user, such as a shooter, may take a weapon with a spent or consumed wipe disposed in a muzzle accessory, disassemble the muzzle accessory to expose the cutting tool and cut a new wipe from a substrate, such as a sheet of rubber approximately 2-5 mm thick. The substrate is placed next to the cutting blade and the cutting blade is pressed through the substrate the distance of the skirt. The cutting tool is a template for cutting wipes the correct dimension and the substrate is a predetermined thickness configured to fit within the receiving member. In some embodiments the receiving member is proximal the plate so that the wipe is pressed into the receiving member and the wipe is secured when the muzzle accessory is reassembled and attached to the muzzle.

In some embodiments the plate of the cutting tool is integrated into the body of the firearm. In some embodiments the plate is configured to be removed from the end of a muzzle accessory. In some embodiments the plate is configured to extend from the distal end of a muzzle accessory. In some embodiments the cutting blade comprises the distal end of the cutting tool. In some embodiments the cutting tool comprises a sound suppressor having a plurality of baffles wherein the shape of the skirt matches the shape of at least one of the baffles. In some embodiments the shape of the baffle is round. In some embodiments the shape of the baffle is a polygon. In some embodiments the end of the accessory is secured with a nut, which is selectively removed. In some embodiments the end of the accessory comprises a plate which may comprise a skirt with a cutting blade. In some embodiments the baffle shape progresses along the bore from a first shape at the proximal end to a second shape at the distal end, in which case the wipe is generally cut to match the baffle on the distal end closest to the firing end of the muzzle. In some embodiments the wipe is configured to be secured adjacent baffles at or near the proximal end. In some embodiments a receiver or receiving member comprises a shoulder configured to retain the wipe. In some embodiments the cutting tool is separate from a firearm, such as in the muzzle device or muzzle accessory. In some embodiments the muzzle tool is integrated into the body of the firearm. In some embodiments an end cap may be selectively removed to allow access to a baffle 30. In some embodiments the baffle may comprise a skirt and a cutting blade. In some embodiments the baffle is used as a cutting tool to cut the substrate.

In some embodiments the muzzle accessory is a muzzle device. In some embodiments the muzzle accessory includes a plate. In some embodiments the muzzle device comprises a skirt with a cutting blade. Some embodiments comprise a muzzle cap. In some embodiments the muzzle cap is configured to selectively couple to a barrel end of a tube. Tube as defined herein is not limited to circular or ovular cross-sectional shape, but also encompasses polygons as well as cross-sectional shapes comprising muzzle accessories as well as "tubeless" muzzle accessories such as the OMEGA 9K™, SALVO 12™, or MAXIM 9™ accessories. In some embodiments the muzzle cap is configured to cover a cutting blade when the muzzle cap is selectively coupled to the end of a muzzle of a firearm. In some embodiments the muzzle cap further comprises a receiver configured to receive a wipe.

In some embodiments the muzzle accessory comprises a compensator. In some embodiments the muzzle accessory comprises a muzzle brake. In some embodiments the muzzle accessory comprises a suppressor configured to suppress sound. In some embodiments the muzzle accessory comprises a flash suppressor. In some embodiments the muzzle accessory has a cross-section that is a polygon.

Some embodiments of the invention comprise a method of preparing a wipe. In some embodiments include the steps of removing a muzzle cap from a muzzle end of a muzzle accessory to expose a cutting edge on the muzzle cap. In some embodiments comprise forcing the cutting edge into a substrate. In some embodiments the substrate is material suitable for a firearm wipe. In some embodiments the cutting edge separates the wipe from the substrate. In some embodiments comprise placing the wipe within the muzzle accessory adjacent to the muzzle cap. In some embodiments comprise replacing the muzzle cap on the muzzle end of the muzzle accessory.

One aspect of the invention concerns a suppressor 10 for a firearm 12 as shown in FIG. 1. In an example embodiment shown in FIG. 2, the suppressor 10 comprises a tube 14 defining a bore 16. The tube 14 has a barrel mounting end 18 and a muzzle end 20. A mounting cap 22 is affixed to the barrel mounting end 18 of the tube 14. The mounting cap 22 is adapted to receive a barrel 24 of the firearm 12 (see also FIG. 1) and may take one of many forms and cross-sectional shapes. Example mounting caps include simple threaded fittings which engage threads on the barrel, a piston mount (aka booster, nielsen device, L.I.D), bayonet-type fittings, as well as quick disconnect fittings as disclosed in U.S. Pat. Nos. 8,555,765; 8,714,301 and 8,950,546, all of which are hereby incorporated by reference herein. Some embodiments utilize mountings more common for handguns, (such as handguns) where a threaded body which moves inside of the suppressor is attached to the firearm barrel, but is not the cap itself, rather it is retained from sliding out of the suppressor by a separate threaded cap with a hole allowing it to reciprocate through. In some embodiments this portion threaded to the barrel has a section inside with a larger diameter shoulder than the retaining cap which allows a spring to return it into position and keeps it from coming out of the suppressor. A muzzle cap 26 is affixed to the muzzle end 20 of the tube 14. The muzzle cap 26 defines an opening 28 aligned with the barrel 24 of the firearm 12 to permit egress of a projectile. A plurality of baffles 30 are positioned within the bore 16 between the mounting cap 22 and the muzzle cap 26.

Figure 3:
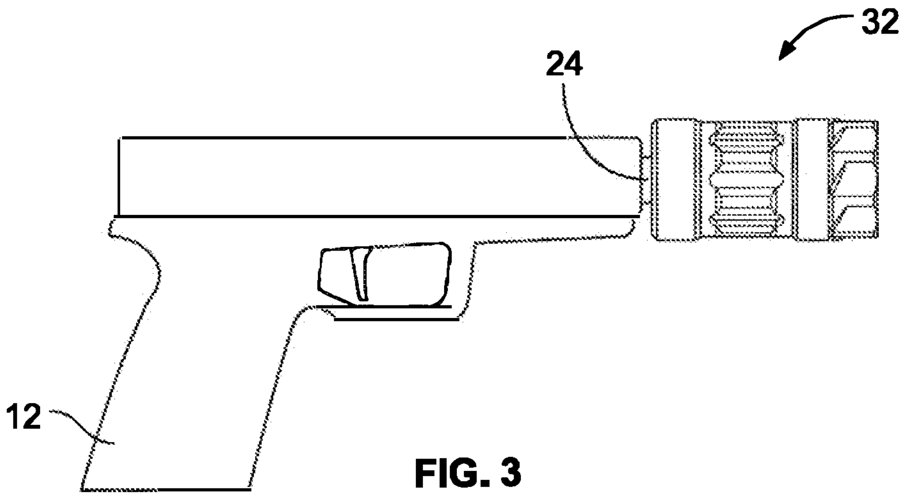
FIG. 3 is a side view of a firearm having an example wiped compensator according to the invention.
Figure 4:
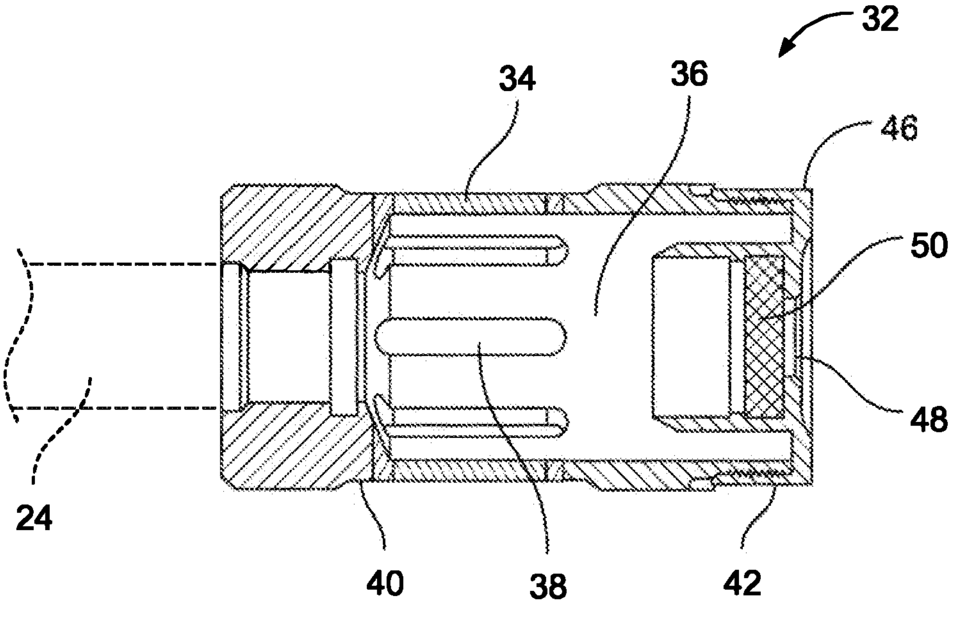
FIG. 4 is a longitudinal sectional view of an example embodiment of a wiped compensator according to the invention.

As shown in FIG. 3, the invention also encompasses a wiped compensator 32 for firearm 12. FIG. 4 shows the wiped compensator example embodiment 32, which comprises a tube 34 defining a bore 36. A plurality of vent holes 38 extend through the tube 34. Tube 34 has a barrel mounting end 40 and a muzzle end 42. A mounting cap 44 40 is affixed to the barrel mounting end 36 of tube 30. The mounting cap 40 is adapted to receive the barrel 24 of the firearm 12 (see also FIG. 3), and, similar to the suppressor described above, example mounting caps 40 include simple threaded fittings which engage threads on the barrel, bayonet-type fittings, as well as quick disconnect fittings as disclosed in the US Patents incorporated by reference herein. A muzzle cap 46 is affixed to the muzzle end 42 of the tube 34. The muzzle cap 46 defines an opening 48 aligned with the barrel 24 of the firearm 12 to permit projectile egress.

Figure 2:
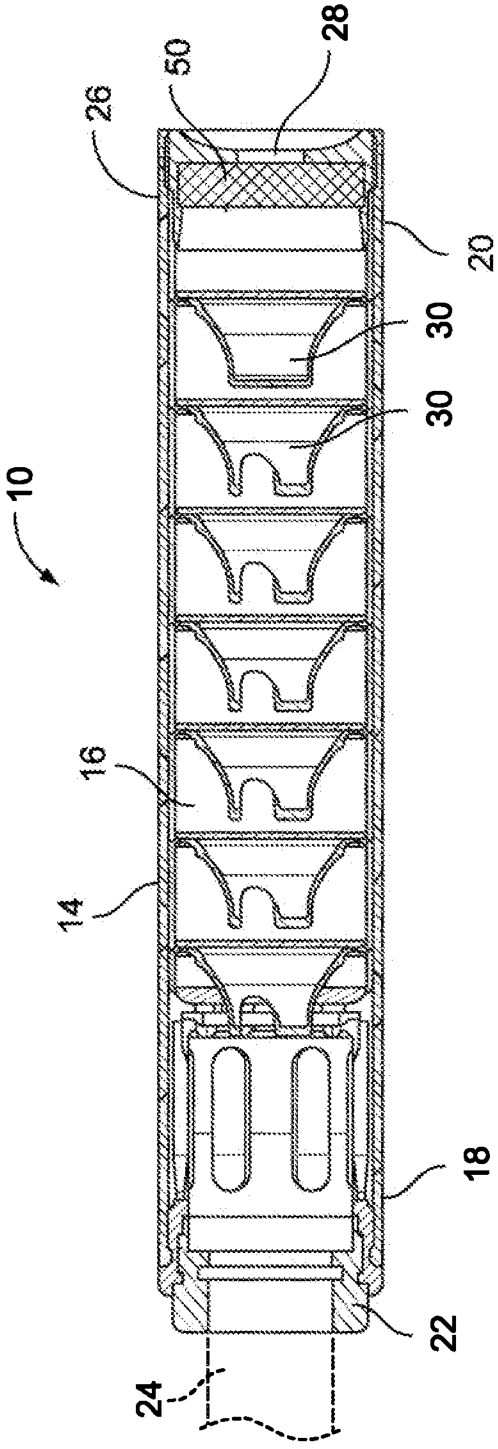
FIG. 2 is a longitudinal sectional view of an example embodiment of a wiped suppressor according to the invention.

As shown in FIGS. 2 and 4, so called "wipes" 50 are positioned muzzle accessories including muzzle brakes, flash suppressors, in both the suppressor 10 and the wiped compensator 32 according to the invention. While a wipe may be positioned anywhere along the firing axis, as shown in FIGS. 2 and 4A a wipe 50 is positioned within the distal end of the muzzle accessory, suppressor tube 14 adjacent to the muzzle cap 26. In some embodiments the assembly housing the wipe 50 is configured to be selectively disassembled, embodiments of which are described in more detail below. A wipe 50 is similarly positioned within the distal end of the compensator tube 34 adjacent to the muzzle cap 46. Wipes are elements which further reduce the acoustic intensity of the firearm's report due to high velocity gases behind the projectile escaping the muzzle. High speed photographs of wipe equipped compensators further show that the presence of a wipe in a compensator causes a greater portion of muzzle blast gases to be diverted through the vent holes 38 as opposed to escaping through the opening 48 in the muzzle cap 46, thereby also improving the effectiveness of the compensator.

Wipes are cut from a substrate of soft, pliant damping material such as, but not limited to polypropylene, neoprene, polyurethane and rubber. Wipe material is selected for its ability to permit a projectile to pass through without significant resistance while forming a seal around the projectile to inhibit the escape of propellant gases, thereby further dissipating acoustic energy and decreasing felt recoil. Wipes deteriorate with each round fired and are thus a consumable item which must be replaced after a finite number of rounds have passed through. It is thus advantageous to provide a cutting blade mounted to the muzzle accessory, such as on one of the suppressor tube, the compensator tube, or the muzzle cap of a suppressor or a compensator. Having a cutting blade as part of the suppressor or compensator allows wipes of the proper dimensions to be readily formed as long as a substrate of wipe material is available.

Figure 5:
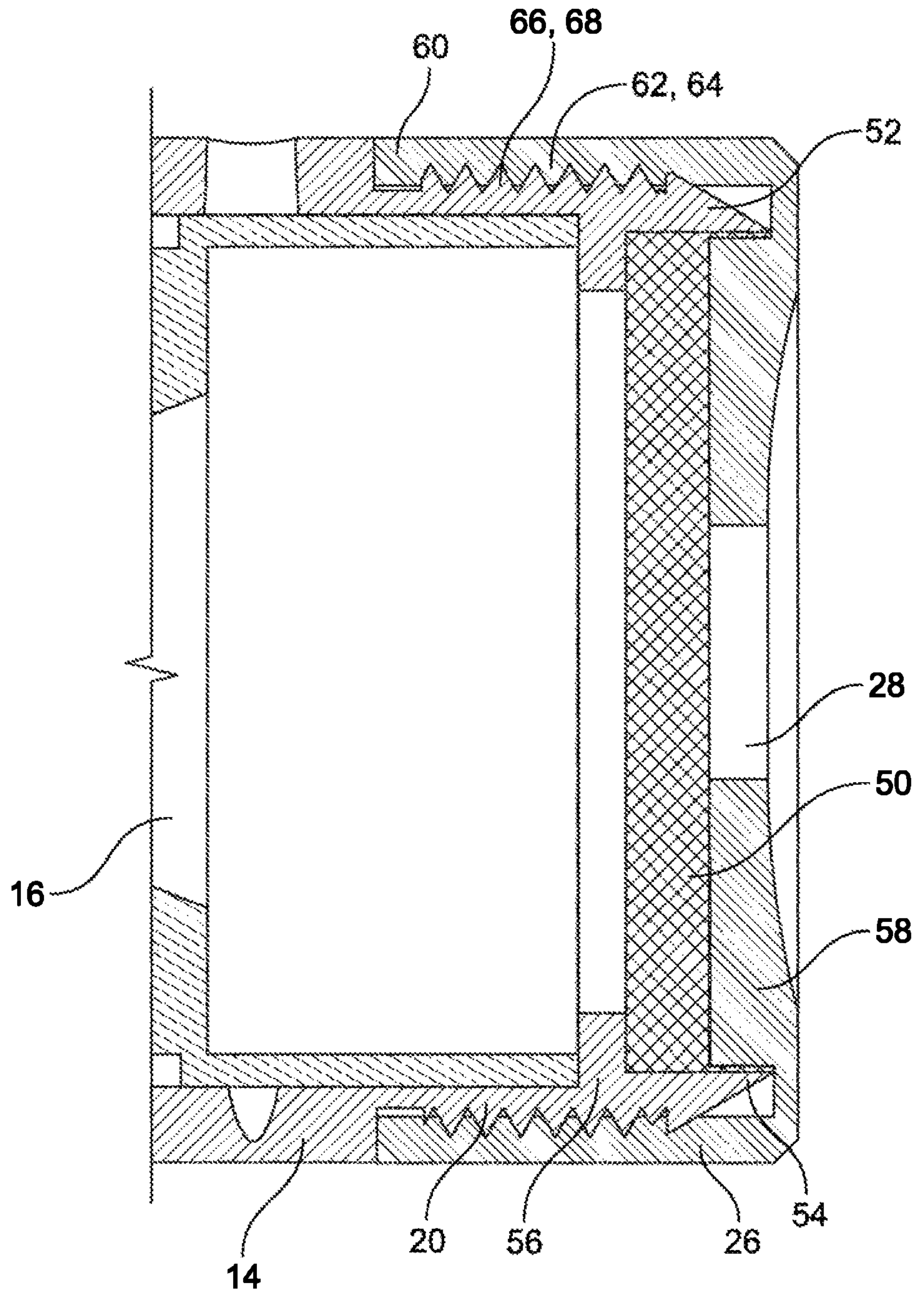
FIG. 5 is a longitudinal sectional view of a portion of an example wiped suppressor or a wiped compensator according to the invention.

FIG. 5 shows an example embodiment wherein a cutting blade 52 is mounted on the muzzle end 20 of a suppressor tube 14. In this example the cutting blade 52 is integrally formed with the tube 14 and comprises a sharpened circumferential edge 54 of the muzzle end of the tube. A shoulder 56 extends circumferentially around the suppressor tube 14 within the bore 16. The shoulder is positioned proximate to the muzzle end 20 of the tube 14. The muzzle cap 26 in this example comprises a plate 58 oriented transversely to the bore 16. Plate 58 defines the muzzle cap opening 28. A skirt 60 surrounds the plate and extends transversely thereto. Attachment of the muzzle cap 26 to tube 14 is effected by a plurality of female screw threads 62 positioned on an inner surface 64 of skirt 60 facing the bore 16. A plurality of male screw threads 66 are positioned on an outer surface 68 of tube 14 at the muzzle end 20. The male screw threads 66 are compatible with the female screw threads 62 for securing the muzzle cap 26 to the tube 14. Wipe 50, cut from a substrate using cutting blade 52, may be positioned within the bore 16, the wipe being captured between the shoulder 56 and the muzzle cap 26. In some embodiments the cutting blade 52 comprises a leading edge of the muzzle accessory to as to conveniently interface with and cut the substrate without the interference other members of the muzzle accessory. Although described and shown for a suppressor, it is understood that the cutting blade 52 comprising a sharpened circumferential edge of a tube, the shoulder 56 and the male screw threads 66 may also be used on the tube 34 of the wiped compensator 32 shown in FIG. 3. Such a compensator will also have the compatible female threads on its muzzle cap 46.

Figure 6:
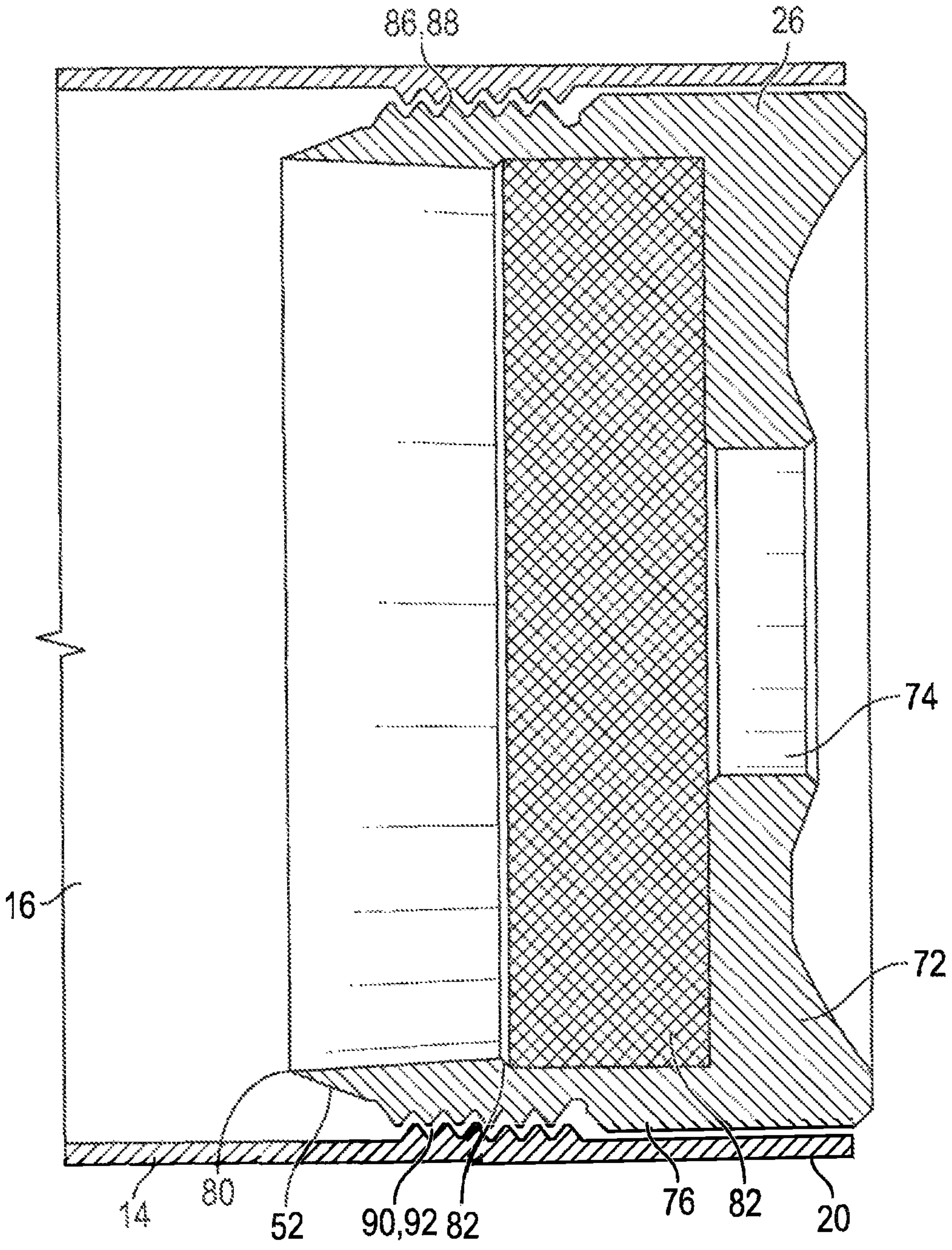
FIG. 6 is a longitudinal sectional view of a portion of an example wiped suppressor or a wiped compensator according to the invention.

FIG. 6 shows an example muzzle cap 26 according to the invention which may be used on both the wiped suppressor 10 shown in FIG. 2 and the wiped compensator 32 shown in FIG. 4, the suppressor being illustrated by way of example. In the example muzzle cap 26 the cutting blade 52 is mounted on the muzzle cap. Muzzle cap 26 comprises a plate 72 oriented transversely to the bore of the suppressor or compensator tube. Plate 72 defines the opening 74 permitting projectile egress. A skirt 76 surrounds the plate 72 and extends transversely to it. The cutting blade 52 comprises a sharpened circumferential edge 80 of the skirt 76. Cutting blade 52 is thus integrally formed with the muzzle cap 26 to form the leading edge of the muzzle cap. Muzzle cap 26 further comprises a shoulder 82 extending circumferentially around an inner surface 84 of the skirt 76. In this example the shoulder 82 is also integrally formed with the muzzle cap 26 by a machined undercut positioned in spaced relation to the plate 72. A wipe 50 may be positioned within the muzzle cap 26 between the shoulder 82 and the plate 72 as shown in FIG. 6. Attachment of the muzzle cap 26 to the suppressor tube or the compensator tube is via a plurality of male screw threads 86 positioned on an outer surface 88 of the skirt 76 facing away from the tube bore 16. As shown in FIG. 6, a plurality of female screw threads 90, positioned on an inner surface 92 of the suppressor tube 14 at its muzzle end 20, are compatible with the male screw threads 86 for securing the muzzle cap 26 to the tube 14.

Figure 7:
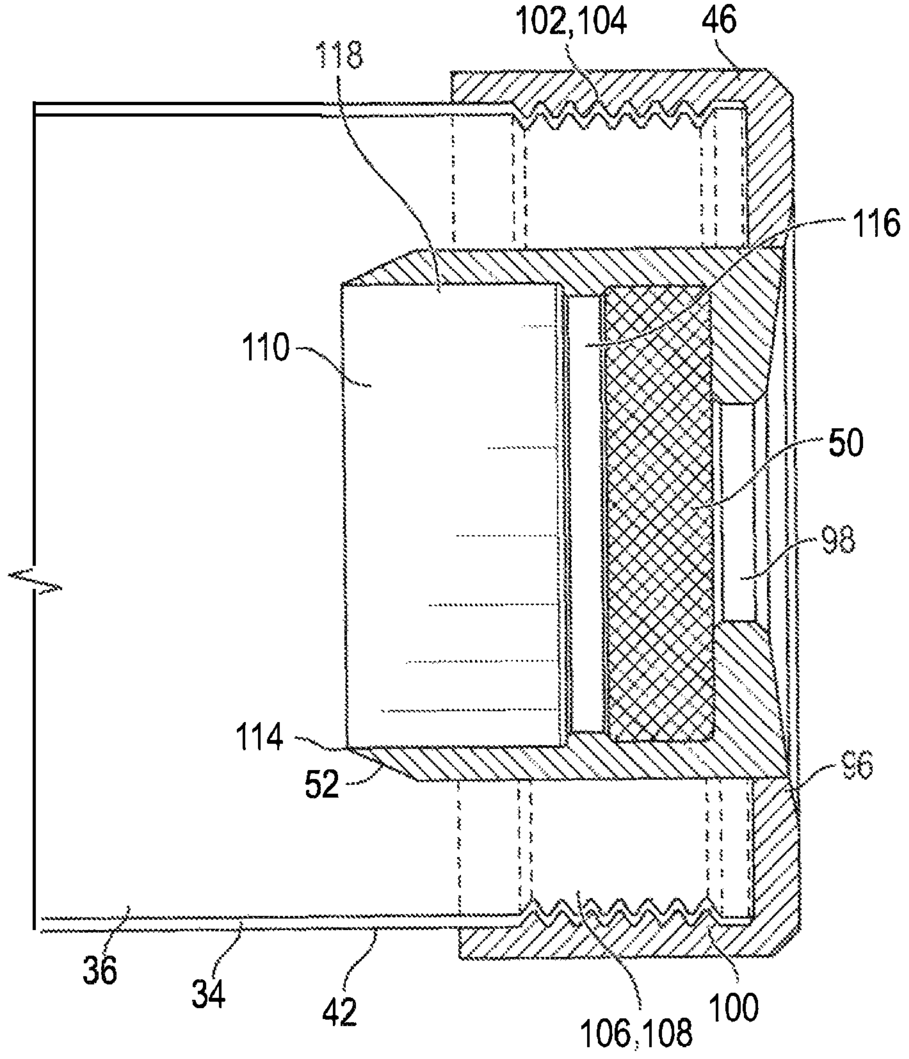
FIG. 7 is a longitudinal sectional view of a portion of an example wiped suppressor or a wiped compensator according to the invention.
Figure 8:
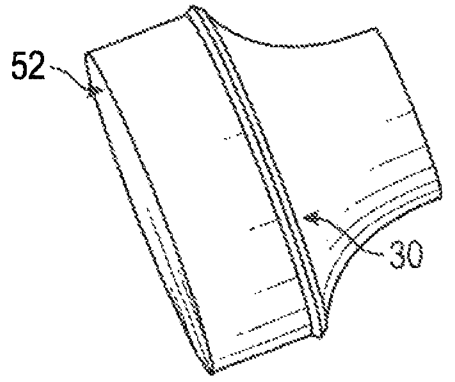
FIG. 8 is a muzzle accessory component configured to cut a wipe substrate.

FIG. 7 shows the example muzzle cap 46 which may be used on both the wiped suppressor 10 shown in FIG. 2 and the wiped compensator 32 shown in FIG. 4, the compensator being illustrated by way of example. Muzzle cap 46 comprises a plate 96 oriented transversely to the bore 36 of the compensator tube 34. Plate 96 defines the projectile egress opening 98. A first skirt 100 surrounds the plate 96 and extends transversely to it. The first skirt 100 engages the muzzle end 42 of the compensator tube 34 for attaching the muzzle cap 46 to it. Attachment may be effected via a plurality of female screw threads 102 positioned on an inner surface 104 of the first skirt 100 facing toward the compensator bore 36. A plurality of male screw threads 106 are positioned on an outer surface 108 of the compensator tube 34 at its muzzle end 42. The male and female screw threads are compatible for securing the muzzle cap 46 to the compensator tube 34. In an alternate embodiment the arrangement of the threads may be reversed and a plurality of male screw threads may be positioned on an outer surface of the first skirt facing away from the bore and a plurality of female screw threads may be positioned on an inner surface of the tube at the muzzle end thereof.

Example muzzle cap 46 further comprises a second skirt 110 extending transversely to the plate 96. Second skirt 110 surrounds the opening 98 and is positioned within a perimeter of the first skirt 100. The cutting blade 52 in this example comprises a sharpened circumferential edge 114 of the second skirt 110. A shoulder 116 extends circumferentially around an inner surface 118 of the second skirt 110 in spaced relation to the plate 96. As shown in FIG. 7, a wipe 50 may be positioned within the second skirt 110, the wipe being captured between the shoulder 116 and the plate 96.

The suppressor and compensator tubes 14 and 34 are shown by way of example as having round cross sectional shapes, but it is understood that cross sectional shapes other than round are also feasible. Likewise, the various skirts 60, 76, 100 and 110 are depicted as having round cross sectional shapes, although other shapes are feasible as well.

The invention comprises muzzle accessories in a variety of shapes, such as that shown in FIGS. 9-10. In some embodiments the cross-sectional area of the muzzle accessory is a polygon. In some embodiments the muzzle cap or end cap 87 is secured in place by tie-rod 89. In this embodiment the skirt may extend in the shape of end cap 87. In some embodiments the skirt may comprise the shape of the baffle, tube or other structure disposed within the muzzle accessory.

The invention also includes methods of preparing a wipe for use in a firearm suppressor or a wiped compensator. In one example embodiment, illustrated in a flow chart in FIG. 8, the method comprises: removing a muzzle cap from a muzzle end of the suppressor or the wiped compensator to expose a cutting edge on the muzzle cap (120); forcing the cutting edge into a substrate comprising material suitable for a firearm wipe, the cutting edge separating the wipe from the substrate (122).

The method may further comprise placing the wipe within the suppressor or the wiped compensator adjacent to the muzzle cap (124). In some embodiments the wipe is fully seated within muzzle cap (124).

The method may further comprise replacing the muzzle cap on the muzzle end of the suppressor or the wiped compensator (126).

Figure 11:
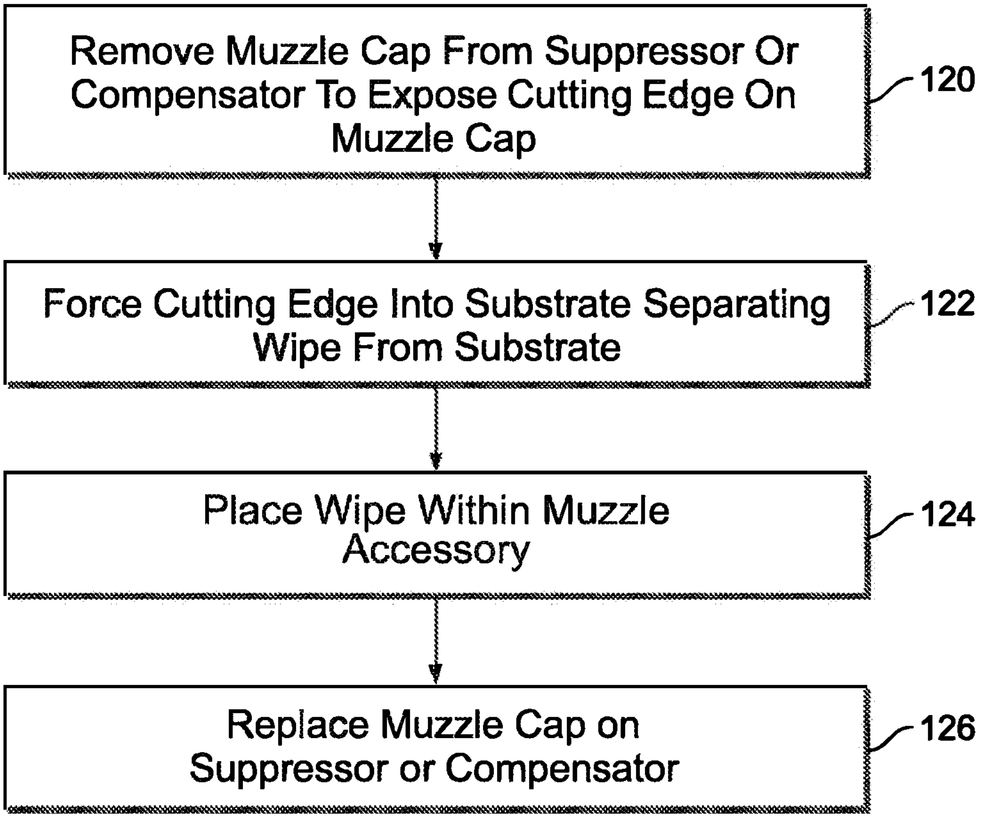
FIGS. 11 and 12 are flow charts illustrating example methods for preparing wipes according to the invention.
Figure 12:
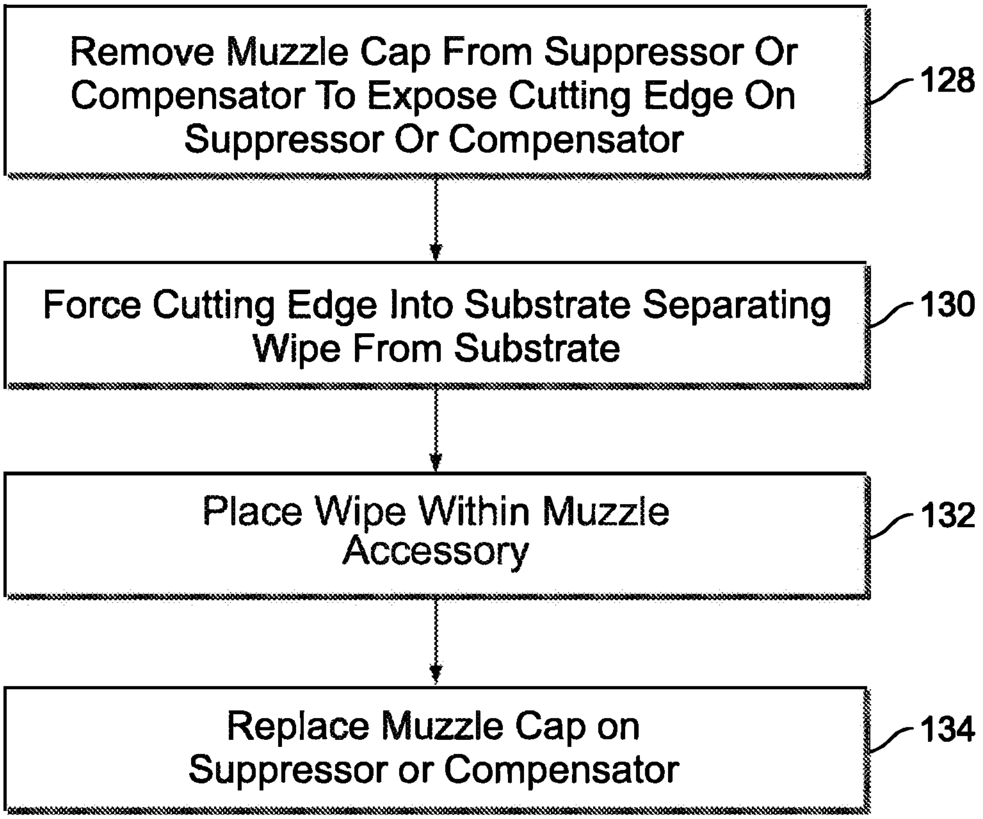

Another example method of preparing a wipe for use in a firearm suppressor or a wiped compensator according to the invention is illustrated in the flow chart of FIG. 11 and comprises: removing a muzzle cap from a muzzle end of the suppressor or the wiped compensator to expose a cutting edge on the suppressor or the wiped compensator (128); forcing the cutting edge into a substrate comprising material suitable for a firearm wipe, the cutting edge separating the wipe from the substrate (130).

The method may further comprise placing the wipe within the suppressor or the wiped compensator adjacent to the muzzle cap (132).

The method may further comprise replacing the muzzle cap on the muzzle end of the suppressor or the wiped compensator (134).

A suppressor for a firearm, said suppressor comprising: a tube defining a bore, said tube having a barrel mounting end and a muzzle end; a mounting cap affixed to said barrel mounting end of said tube, said mounting cap adapted to receive a barrel of said firearm; a muzzle cap affixed to said muzzle end of said tube, said muzzle cap defining an opening aligned with said barrel of said firearm; a plurality of baffles positioned within said bore between said mounting cap and said muzzle cap; and a cutting blade mounted on one of said tube or said muzzle cap. In some embodiments the cutting blade is mounted on said muzzle end of said tube. In some embodiments the cutting blade is integrally formed with said tube. In some embodiments the cutting blade comprises a sharpened circumferential edge of said muzzle end of said tube. Some embodiments a suppressor wherein the muzzle cap comprises a plate oriented transversely to said bore, said plate defining said opening, a skirt surrounding said plate and extending transversely thereto; a plurality of female screw threads are positioned on an inner surface of said skirt facing said bore; a plurality of male screw threads are positioned on an outer surface of said tube at said muzzle end thereof, said male screw threads being compatible with said female screw threads for securing said muzzle cap to said tube.

In some embodiments the suppressor comprises a shoulder extending circumferentially around said tube within said bore, said shoulder being positioned proximate to said muzzle end of said tube. In some embodiments the suppressor comprises a wipe positioned within said bore, said wipe being captured between said shoulder and said muzzle cap. In some embodiments the cutting blade is mounted on said muzzle cap. In some embodiments the cutting blade is integrally formed with said muzzle cap. Some embodiments comprise the suppressor wherein said muzzle cap comprises a plate oriented transversely to said bore, said plate defining said opening; a skirt surrounds said plate and extends transversely thereto; and said cutting blade comprises a sharpened circumferential edge of said skirt. In some embodiments the suppressor further comprises a plurality of male screw threads positioned on an outer surface of said skirt facing away from said bore; a plurality of female screw threads positioned on an inner surface of said tube at said muzzle end thereof, said female screw threads being compatible with said male screw threads for securing said muzzle cap to said tube.

In some embodiments the suppressor further comprises a shoulder extending circumferentially around an inner surface of said skirt in spaced relation to said plate. In some embodiments the suppressor further comprises a wipe positioned within said muzzle cap, said wipe being between said shoulder and said plate. Some embodiments comprise the suppressor wherein: said muzzle cap comprises a plate oriented transversely to said bore, said plate defining said opening; a first skirt surrounds said plate and extends transversely thereto, said first skirt engaging said muzzle end of said tube for attaching said muzzle cap thereto; a second skirt extends transversely to said plate and surrounds said opening, said second skirt being positioned within a perimeter of said first skirt; and said cutting blade comprises a sharpened circumferential edge of said second skirt.

In some embodiments the suppressor further comprises a shoulder extending circumferentially around an inner surface of said second skirt in spaced relation to said plate. In some embodiments the suppressor further comprises a wipe positioned within said second skirt, said wipe being captured between said shoulder and said plate. Some embodiments comprise a suppressor, wherein: a plurality of male screw threads are positioned on an outer surface of said first skirt facing away from said bore; a plurality of female screw threads are positioned on an inner surface of said tube at said muzzle end thereof, said female screw threads being compatible with said male screw threads for securing said muzzle cap to said tube. Some embodiments comprise a suppressor, wherein: a plurality of female screw threads are positioned on an inner surface of said first skirt facing toward said bore; a plurality of male screw threads are positioned on an outer surface of said tube at said muzzle end thereof, said female screw threads being compatible with said male screw threads for securing said muzzle cap to said tube. Some embodiments comprise a suppressor, wherein the tube has a round cross sectional shape. Some embodiments comprise a suppressor, wherein the skirt has a round cross sectional shape. Some embodiments comprise a suppressor, wherein: said first and second skirts have round cross sectional shapes.

Some embodiments comprise a muzzle cap for a component of a firearm, said muzzle cap comprising: a plate defining an opening; a skirt surrounding said plate and extending transversely thereto; a cutting blade comprising a sharpened circumferential edge of said skirt. In some embodiments the muzzle cap further comprises a plurality of male screw threads positioned on an outer surface of said skirt. In some embodiments the muzzle cap further comprises a shoulder extending circumferentially around an inner surface of said skirt in spaced relation to said plate. In some embodiments the muzzle cap further comprises a wipe positioned within said muzzle cap between said shoulder and said plate. In some embodiments the muzzle cap comprise a skirt wherein said skirt has a round cross sectional shape.

In some embodiments comprise a muzzle cap for a component of a firearm comprising: a plate defining an opening; a first skirt surrounding said plate and extending transversely thereto; a second skirt extending transversely to said plate, said second skirt surrounding said opening and being positioned within a perimeter of said first skirt; a cutting blade comprising a sharpened circumferential edge of said second skirt.

In some embodiments the muzzle cap further comprises a shoulder extending circumferentially around an inner surface of said second skirt in spaced relation to said plate. In some embodiments the muzzle cap further comprises a wipe positioned within said second skirt between said shoulder and said plate. Some embodiments of the muzzle cap comprise a plurality of male screw threads are positioned on an outer surface of said first skirt. Some embodiments of the muzzle cap comprise a plurality of female screw threads are positioned on an inner surface of said first skirt. Some embodiments of the muzzle cap comprise said first and second skirts have round cross sectional shapes.

Some embodiments comprise a wiped suppressor or a wiped compensator for a firearm. Some embodiments comprise a tube defining a bore, a plurality of vent holes extending through said tube, said tube having a barrel mounting end and a muzzle end; a mounting cap affixed to said barrel mounting end of said tube, said mounting cap adapted to receive a barrel of said firearm; a muzzle cap affixed to said muzzle end of said tube, said muzzle cap defining an opening aligned with said barrel of said firearm; a wipe positioned within said tube adjacent to said muzzle cap.

Some embodiments comprise a cutting blade mounted on one of said tube or said muzzle cap. In some embodiments the wiped compensator comprise a cutting blade mounted on said muzzle end of said tube. In some embodiments of the wiped compensator the cutting blade is integrally formed with said tube. In some embodiments of the wiped compensator the cutting blade comprises a sharpened circumferential edge of said muzzle end of said tube. In some embodiments of the wiped compensator comprise a muzzle cap comprising a plate oriented transversely to said bore, said plate defining said opening, a skirt surrounding said plate and extending transversely thereto; a plurality of female screw threads are positioned on an inner surface of said skirt facing said bore; a plurality of male screw threads are positioned on an outer surface of said tube at said muzzle end thereof, said male screw threads being compatible with said female screw threads for securing said muzzle cap to said tube.

In some embodiments of the wiped compensator the further comprise a shoulder extending circumferentially around said tube within said bore, said shoulder being positioned proximate to said muzzle end of said tube. Some embodiments comprise the wiped compensator wherein said wipe is captured between said shoulder and said muzzle cap. Some embodiments comprise the wiped compensator wherein said cutting blade is mounted on said muzzle cap. Some embodiments comprise the wiped compensator wherein said cutting blade is integrally formed with said muzzle cap. Some embodiments comprise the wiped compensator wherein: said muzzle cap comprises a plate oriented transversely to said bore, said plate defining said opening; a skirt surrounds said plate and extends transversely thereto; and said cutting blade comprises a sharpened circumferential edge of said skirt. Some embodiments comprise the wiped compensator further comprise: a plurality of male screw threads positioned on an outer surface of said skirt facing away from said bore; a plurality of female screw threads positioned on an inner surface of said tube at said muzzle end thereof, said female screw threads being compatible with said male screw threads for securing said muzzle cap to said tube. Some embodiments of the wiped compensator further comprise a shoulder extending circumferentially around an inner surface of said skirt in spaced relation to said plate.

Some embodiments of the wiped compensator further comprise wipe positioned within said muzzle cap, said wipe being between said shoulder and said plate. Some embodiments comprise the wiped compensator wherein: said muzzle cap comprises a plate oriented transversely to said bore, said plate defining said opening; a first skirt surrounds said plate and extends transversely thereto, said first skirt engaging said muzzle end of said tube for attaching said muzzle cap thereto; a second skirt extends transversely to said plate and surrounds said opening, said second skirt being positioned within a perimeter of said first skirt; and said cutting blade comprises a sharpened circumferential edge of said second skirt.

Some embodiments of the wiped compensator further comprise further comprising a shoulder extending circumferentially around an inner surface of said second skirt in spaced relation to said plate. Some embodiments comprise the wiped compensator wherein said wipe is positioned within said second skirt, said wipe being captured between said shoulder and said plate.

Some embodiments comprise the wiped compensator wherein: a plurality of male screw threads are positioned on an outer surface of said first skirt facing away from said bore; a plurality of female screw threads are positioned on an inner surface of said tube at said muzzle end thereof, said female screw threads being compatible with said male screw threads for securing said muzzle cap to said tube. Some embodiments comprise the wiped compensator wherein: a plurality of female screw threads are positioned on an inner surface of said first skirt facing toward said bore; a plurality of male screw threads are positioned on an outer surface of said tube at said muzzle end thereof, said female screw threads being compatible with said male screw threads for securing said muzzle cap to said tube. Some embodiments comprise the wiped compensator wherein said tube has a round cross sectional shape. Some embodiments comprise the wiped compensator wherein said skirt has a round cross sectional shape. Some embodiments comprise the wiped compensator wherein said first and second skirts have round cross sectional shapes.

Some of the invention comprise a method of preparing a wipe for use in a firearm suppressor or a wiped compensator. Some embodiments comprise removing a muzzle cap from a muzzle end of said suppressor or said wiped compensator to expose a cutting edge on said muzzle cap. Some embodiments comprise forcing said cutting edge into a substrate comprising material suitable for a firearm wipe, said cutting edge separating said wipe from said substrate. Some embodiments further comprising placing said wipe within said suppressor or said wiped compensator adjacent to said muzzle cap. Some embodiments comprise replacing said muzzle cap on said muzzle end of said suppressor or said wiped compensator.

Some embodiments of the invention comprise a method of preparing a wipe for use in a firearm suppressor or a wiped compensator. Some embodiments comprise removing a muzzle cap from a muzzle end of said suppressor or said wiped compensator to expose a cutting edge on said suppressor or said wiped compensator. Come embodiments comprise forcing said cutting edge into a substrate comprising material suitable for a firearm wipe, said cutting edge separating said wipe from said substrate. Come embodiments further comprising placing said wipe within said suppressor or said wiped compensator adjacent to said muzzle cap. Some embodiments further comprise replacing said muzzle cap on said muzzle end of said suppressor or said wiped compensator.

In closing, it is to be understood that the embodiments of the disclosure disclosed herein are illustrative of the principles of the present disclosure. Other modifications that may be employed are within the scope of the disclosure. Thus, by way of example, but not of limitation, alternative configurations of the present disclosure may be utilized in accordance with the teachings herein. Accordingly, the present disclosure is not limited to that precisely as shown and described.

What is claimed is:

1. A firearm accessory, comprising:
an elongate body configured to integrate with a firearm, wherein the elongate body comprises a bore configured to align with a bore of the firearm; and
an annular skirt extending from the elongate body, the annular skirt comprising a sharpened edge configured to cut, from a substrate that is separate from the firearm, a portion of the substrate, wherein a shape of the portion of the substrate is based at least in part on a shape of the annular skirt.

2. The firearm accessory of claim 1, further comprising:
a receiving member configured to retain the portion of the substrate cut from the substrate by the annular skirt and to position the portion of the substrate transversely to a firing axis of the firearm.

3. The firearm accessory of claim 2, wherein the receiving member comprises:
a shoulder configured to retain the portion of the substrate cut from the substrate.

4. The firearm accessory of claim 1, wherein the annular skirt extends from a distal end of the elongate body.

5. A firearm accessory, comprising:
an elongate body configured to integrate with a firearm, wherein the elongate body comprises a bore configured to align with a bore of the firearm;
a skirt extending from the elongate body, the skirt comprising a sharpened edge configured to cut, from a substrate that is separate from the firearm, a portion of the substrate; and
a cap configured to attach to the elongate body and cover the sharpened edge of the skirt.

6. The firearm accessory of claim 1, further comprising:
a baffle, wherein the annular skirt is integrated into the baffle.

7. The firearm accessory of claim 1, further comprising:
a sound suppressor comprising the elongate body and having a plurality of baffles, wherein a shape of the sharpened edge of the annular skirt matches a shape of at least one baffle of the plurality of baffles.

8. A cap, comprising:
an elongate body configured to attach to a distal end of a firearm accessory, wherein the elongate body comprises a bore that is configured to align with a bore of the firearm accessory; and
a sharpened edge extending from a proximal end of the elongate body, the sharpened edge configured to cut, from a substrate that is separate from a firearm, a portion of the substrate,
wherein the elongate body comprises a receiving member configured to retain the portion of the substrate cut from the substrate by the sharpened edge and to position the portion of the substrate transversely to a firing axis of the firearm accessory.

9. The cap of claim 8, wherein the firearm accessory is configured to cover the sharpened edge.

10. The cap of claim 8, wherein the elongate body is configured to integrate with the firearm via the firearm accessory.

11. The cap of claim 8, wherein the proximal end of the elongate body comprises threads that are configured to mate with complementary threads at the distal end of the firearm accessory.

12. A method, comprising:
detaching an elongate body from a firearm;
forcing a cutting edge of the elongate body into a substrate that is separate from the firearm to cut, from the substrate, a portion of the substrate, wherein the portion of the substrate is positioned within a receiving member of the elongate body after the portion of the substrate is cut from the substrate; and
reattaching the elongate body to the firearm.

13. The method of claim 12, further comprising:
inserting the portion of the substrate into the receiving member of the elongate body.

14. The method of claim 13, wherein:
the elongate body is reattached to the firearm after inserting the portion of the substrate into the receiving member, and
the receiving member positions the portion of the substrate transversely to a firing axis of the firearm based at least in part on the elongate body being attached to the firearm.

15. The method of claim 12, wherein the portion of the substrate is retained in the receiving member of the elongate body based at least in part on forcing the cutting edge into the substrate.

16. The method of claim 12, further comprising:
exposing the cutting edge of the elongate body prior to forcing the cutting edge of the elongate body into the substrate.

17. The method of claim 12, wherein a firearm accessory comprises the elongate body, and wherein detaching the elongate body from the firearm comprises detaching the firearm accessory from the firearm.

18. The method of claim 12, wherein a cap comprises the elongate body, and wherein detaching the elongate body from the firearm comprises detaching the cap from a firearm accessory that is attached to the firearm.

19. The firearm accessory of claim 1, wherein the shape of the portion of the substrate is annular and matches the shape of the annular skirt.

20. The firearm accessory of claim 5, wherein a shape of the skirt is an annular circle, a polygon, or an oval.

21. The cap of claim 8, wherein the receiving member comprises a shoulder configured to retain the portion of the substrate cut from the substrate.

* * * * *